United States Patent
Ngo et al.

(10) Patent No.: US 11,144,530 B2
(45) Date of Patent: Oct. 12, 2021

(54) REGULATING MIGRATION AND RECALL ACTIONS FOR HIGH LATENCY MEDIA (HLM) ON OBJECTS OR GROUP OF OBJECTS THROUGH METADATA LOCKING ATTRIBUTES

(71) Applicant: International Business Machines Corporation, Armonk, NY (US)

(72) Inventors: Khanh V. Ngo, Tucson, AZ (US); Simon Lorenz, Geisenheim (DE); Dominic Mueller-Wicke, Weilburg (DE); Slavisa Sarafijanovic, Adliswil (CH); Harald Seipp, Mainz (DE); Takeshi Ishimoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 15/851,546

(22) Filed: Dec. 21, 2017

(65) Prior Publication Data
US 2019/0197144 A1    Jun. 27, 2019

(51) Int. Cl.
| | |
|---|---|
| G06F 16/30 | (2019.01) |
| G06F 9/54 | (2006.01) |
| G06F 16/23 | (2019.01) |
| G06F 16/21 | (2019.01) |
| H04L 29/08 | (2006.01) |

(52) U.S. Cl.
CPC .......... *G06F 16/2343* (2019.01); *G06F 9/548* (2013.01); *G06F 16/214* (2019.01); *H04L 67/10* (2013.01); *H04L 67/1097* (2013.01); *H04L 67/12* (2013.01)

(58) Field of Classification Search
CPC .... G06F 9/548; G06F 16/214; G06F 16/2343; H04L 67/12; H04L 67/10; H04L 67/1097
USPC ........................................................ 707/704
See application file for complete search history.

(56) References Cited

U.S. PATENT DOCUMENTS

| | | |
|---|---|---|
| 7,162,724 B2 | 1/2007 | Blaser et al. |
| 7,461,086 B1 | 12/2008 | Hurren et al. |
| 8,484,417 B2 | 7/2013 | Xun et al. |
| 8,635,305 B1 * | 1/2014 | Subramaniam ..... G06F 16/9574 709/219 |
| 8,972,627 B2 * | 3/2015 | Strasser ................ G06F 3/0659 710/48 |
| 9,043,372 B2 | 5/2015 | Makkar et al. |
| 9,769,213 B1 | 9/2017 | Madisetti et al. |

(Continued)

FOREIGN PATENT DOCUMENTS

WO    2016010690 A1    1/2016

OTHER PUBLICATIONS

Oracle® Database Concepts, 11g Release 2 (11.2), Sep. 2011 (Year: 2011).*

(Continued)

*Primary Examiner* — Kuen S Lu
(74) *Attorney, Agent, or Firm* — Zilka-Kotab, P.C.

(57) ABSTRACT

A computer-implemented method according to one embodiment includes receiving a request to perform a high-latency media (HLM) action on an object or a group of objects, identifying metadata associated with the object or group of objects, and conditionally allowing the HLM action to be performed on the object or group of objects, based on the HLM action and the metadata associated with the object.

18 Claims, 10 Drawing Sheets

(56) References Cited

U.S. PATENT DOCUMENTS

| | | | | |
|---|---|---|---|---|
| 9,770,657 | B2* | 9/2017 | Perlman | A63F 13/358 |
| 2006/0101081 | A1* | 5/2006 | Lin | G06F 16/2343 |
| 2006/0293879 | A1* | 12/2006 | Zhao | G06F 16/84 |
| | | | | 704/9 |
| 2010/0250508 | A1* | 9/2010 | Erofeev | G06F 16/1744 |
| | | | | 707/704 |
| 2010/0281230 | A1* | 11/2010 | Rabii | G06F 12/121 |
| | | | | 711/165 |
| 2012/0072854 | A1* | 3/2012 | Zhou | G06F 40/166 |
| | | | | 715/751 |

OTHER PUBLICATIONS

Keeton et al., "Automated SQL Query Generation for file search operations in a scale out file system", Hewlett-Packard Development Company, 2014, pp. 1-12.

NIST, "NIST Cloud Computing Program," Information Technology Laboratory, retrieved from http://www.nist.gov/itl/cloud/, Nov. 2013, pp. 1-2.

Mell et al., "The NIST Definition of Cloud Computing," Version 15, Oct. 2009, pp. 1-2.

Mell et al., "The NIST Definition of Cloud Computing," National Institute of Standards and Technology, Special Publication 800-145, Sep. 2011, pp. 1-7.

CAE Specification, "Systems Management: Data Storage Management (XDSM) API," The Open Group, Feb. 1997, pp. 1-198.

* cited by examiner

REGULATING MIGRATION AND RECALL ACTIONS FOR HIGH LATENCY MEDIA (HLM) ON OBJECTS OR GROUP OF OBJECTS THROUGH METADATA LOCKING ATTRIBUTES

BACKGROUND

The present invention relates to data storage management, and more specifically, this invention relates to conditionally allowing one or more high latency media (HLM) actions on a stored object, based on metadata associated with the object.

Object storage is a common means for providing access to shared data. For example, objects may be stored within an object store, and access to those objects may be provided utilizing an application programming interface (API). However, conflicts may arise during data management (e.g., when users request conflicting actions to be performed on a stored object).

SUMMARY

A computer-implemented method according to one embodiment includes receiving a request to perform a high-latency media (HLM) action on an object or a group of objects, identifying metadata associated with the object or group of objects, and conditionally allowing the HLM action to be performed on the object or group of objects, based on the HLM action and the metadata associated with the object.

According to another embodiment, a computer program product for controlling a high-latency media (HLM) action on an object or group of objects comprises a computer readable storage medium having program instructions embodied therewith, wherein the computer readable storage medium is not a transitory signal per se, and where the program instructions are executable by a processor to cause the processor to perform a method comprising receiving a request to perform the HLM action on the object or group of objects, utilizing the processor, identifying metadata associated with the object or group of objects, utilizing the processor, and conditionally allowing the HLM action to be performed on the object or group of objects, based on the HLM action and the metadata associated with the object or group of objects, utilizing the processor.

A system according to another embodiment includes a processor, and logic integrated with the processor, executable by the processor, or integrated with and executable by the processor, where the logic is configured to receive a request to perform a high-latency media (HLM) action on an object or group of objects, identify metadata associated with the object or group of objects, and conditionally allow the HLM action to be performed on the object or group of objects, based on the HLM action and the metadata associated with the object or group of objects.

Other aspects and embodiments of the present invention will become apparent from the following detailed description, which, when taken in conjunction with the drawings, illustrate by way of example the principles of the invention.

DETAILED DESCRIPTION

Figure 1:
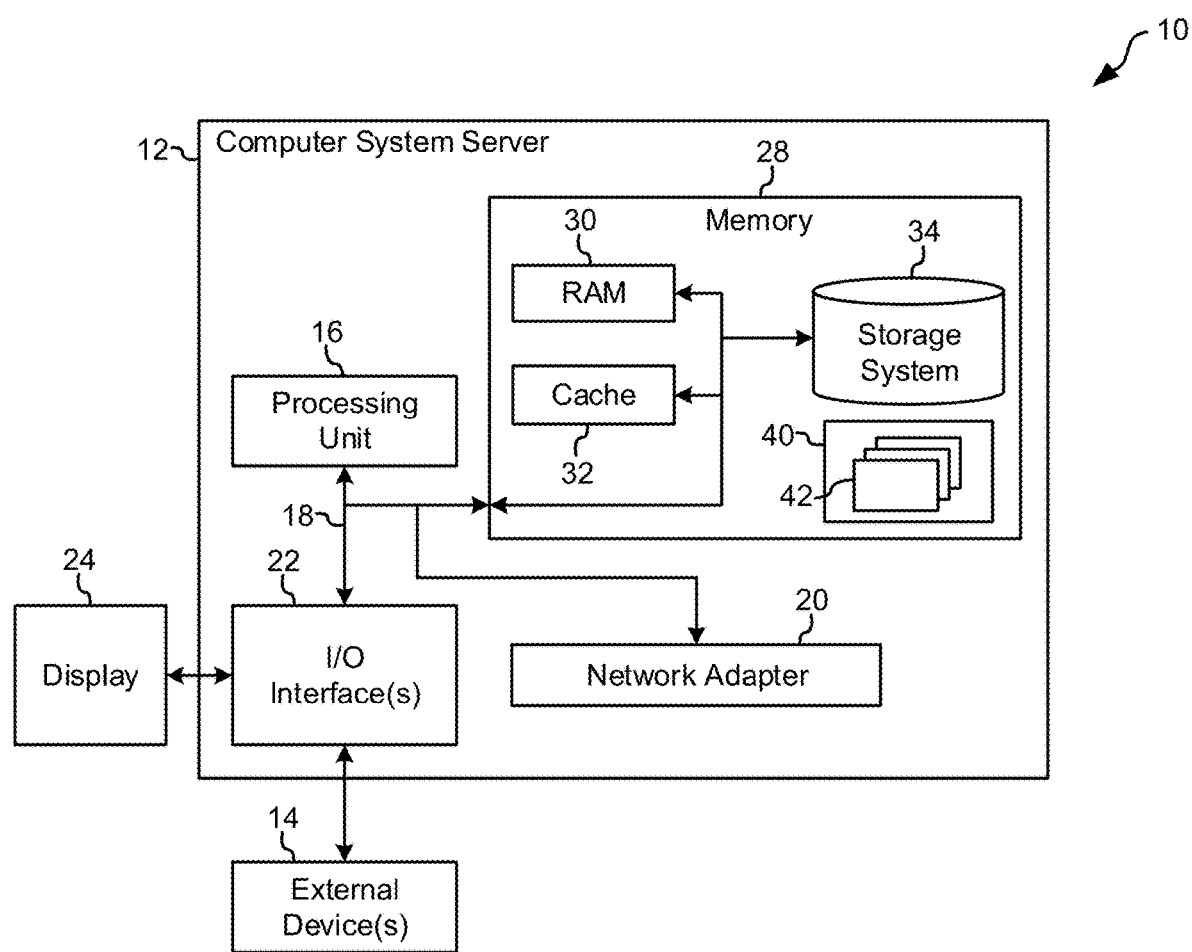
FIG. 1 depicts a cloud computing node according to an embodiment of the present invention.

The following description discloses several preferred embodiments of systems, methods and computer program products for controlling HLM actions on objects. Various embodiments provide a method for comparing a HLM action request for an object to metadata of that object in order to determine whether a conflict exists, and conditionally granting the HLM action request, based on the comparing.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for controlling HLM actions on objects.

In one general embodiment, a computer-implemented method includes receiving a request to perform a high-latency media (HLM) action on an object or a group of objects, identifying metadata associated with the object or group of objects, and conditionally allowing the HLM action to be performed on the object or group of objects, based on the HLM action and the metadata associated with the object.

In another general embodiment, a computer program product for controlling a high-latency media (HLM) action on an object or group of objects comprises a computer readable storage medium having program instructions embodied therewith, wherein the computer readable storage medium is not a transitory signal per se, and where the program instructions are executable by a processor to cause the processor to perform a method comprising receiving a request to perform the HLM action on the object or group of objects, utilizing the processor, identifying metadata associated with the object or group of objects, utilizing the processor, and conditionally allowing the HLM action to be performed on the object or group of objects, based on the HLM action and the metadata associated with the object or group of objects, utilizing the processor.

In another general embodiment, a system includes a processor, and logic integrated with the processor, executable by the processor, or integrated with and executable by the processor, where the logic is configured to receive a request to perform a high-latency media (HLM) action on an object or group of objects, identify metadata associated with the object or group of objects, and conditionally allow the HLM action to be performed on the object or group of objects, based on the HLM action and the metadata associated with the object or group of objects.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
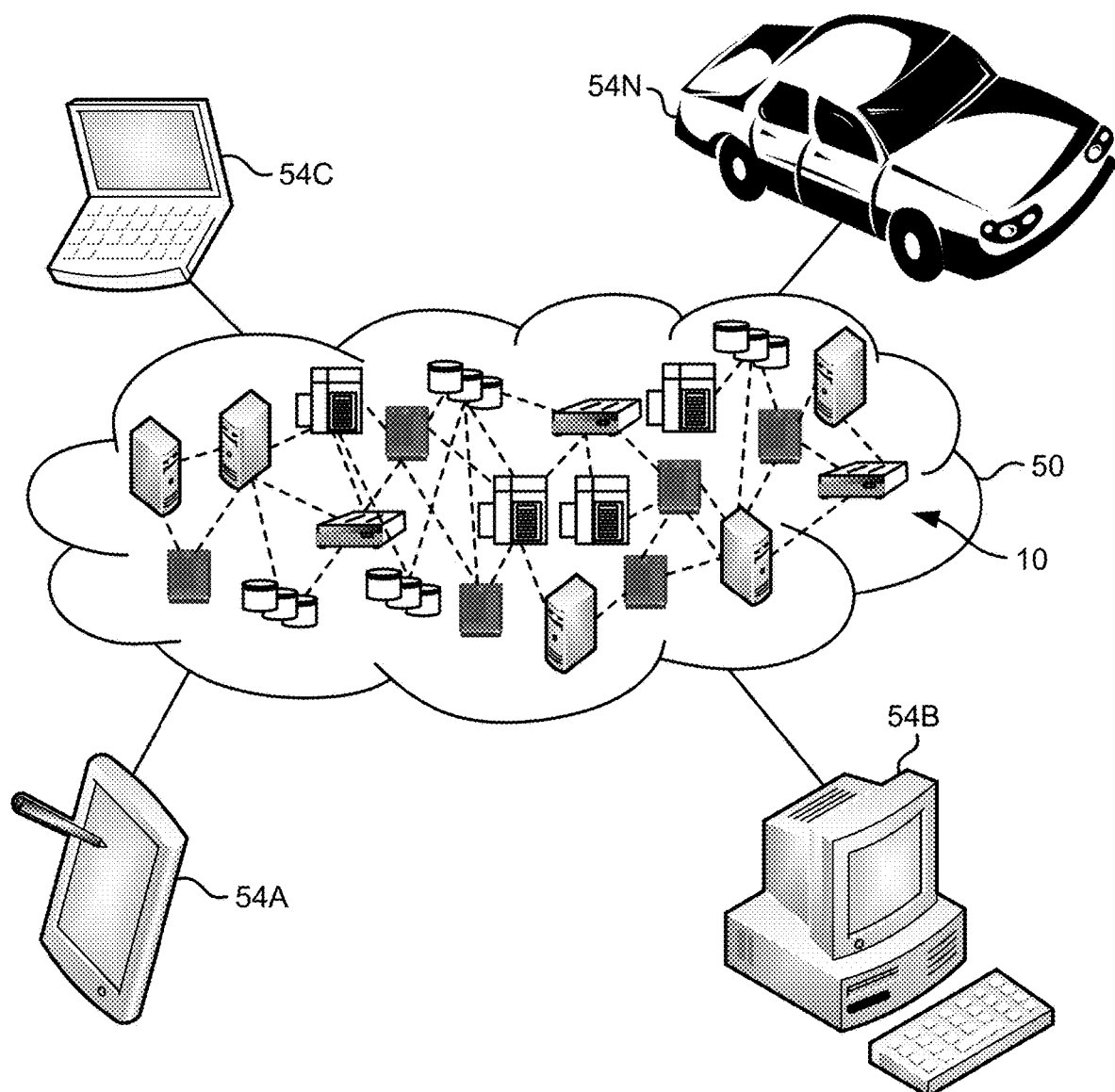
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
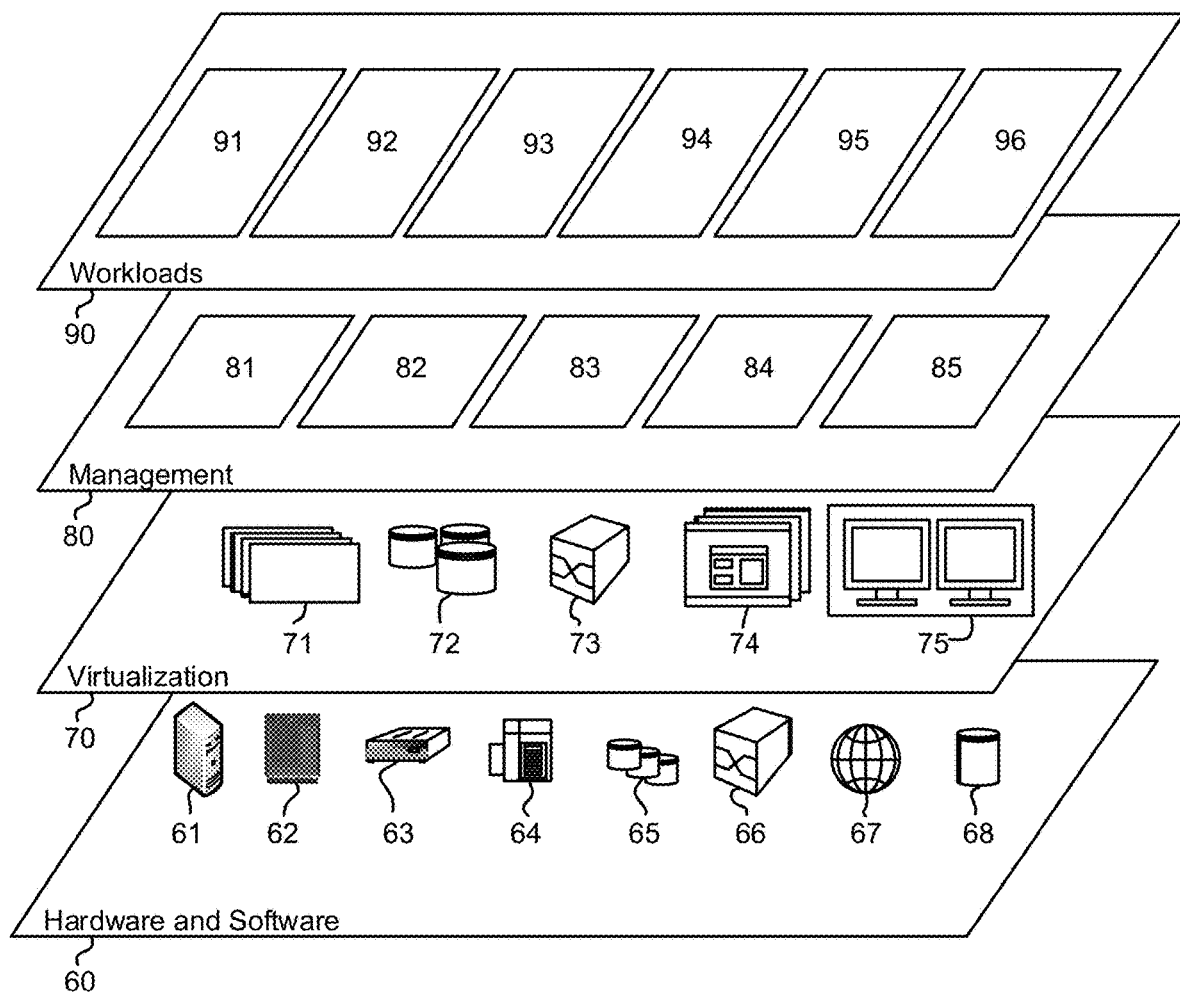
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
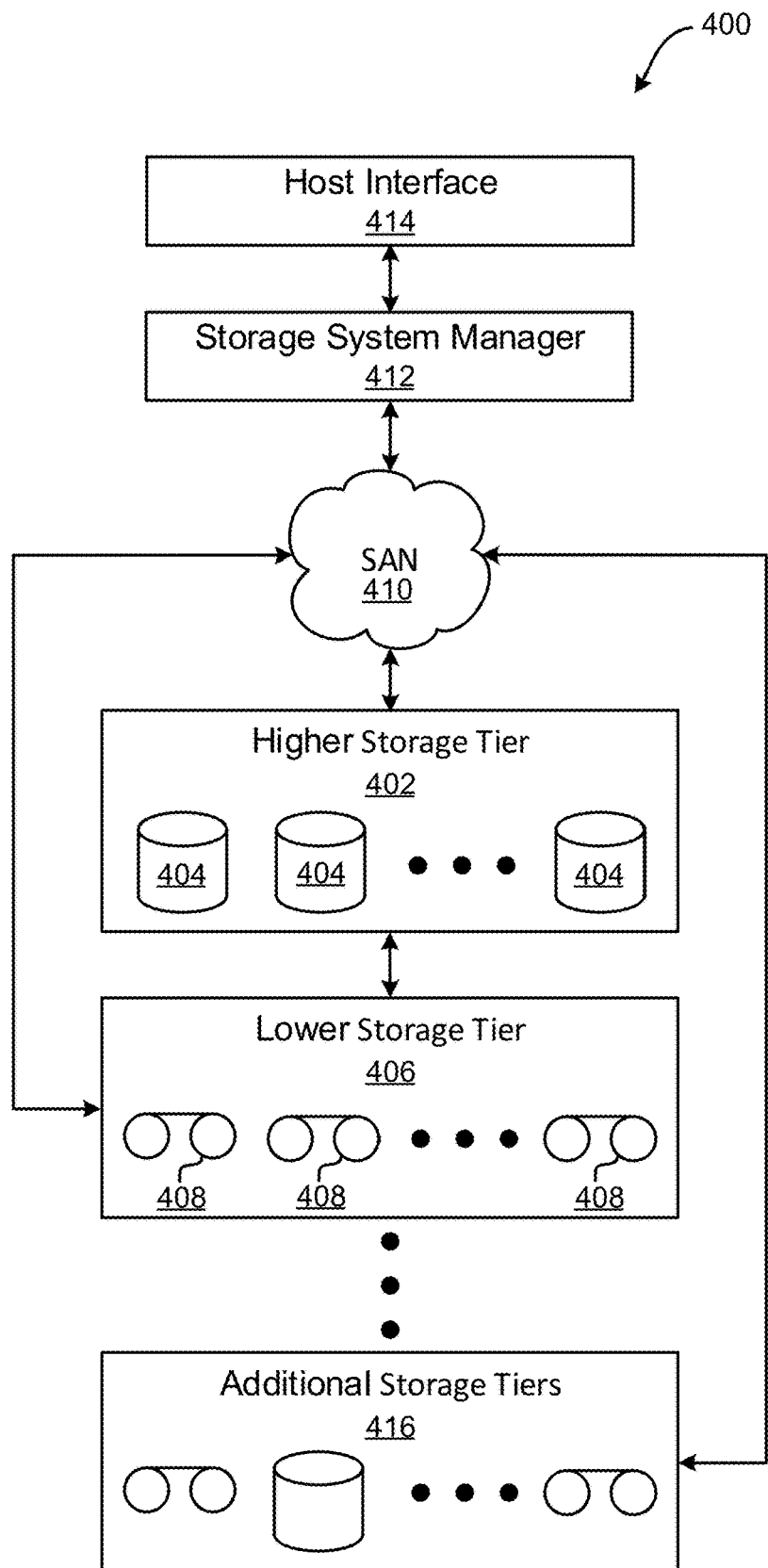
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
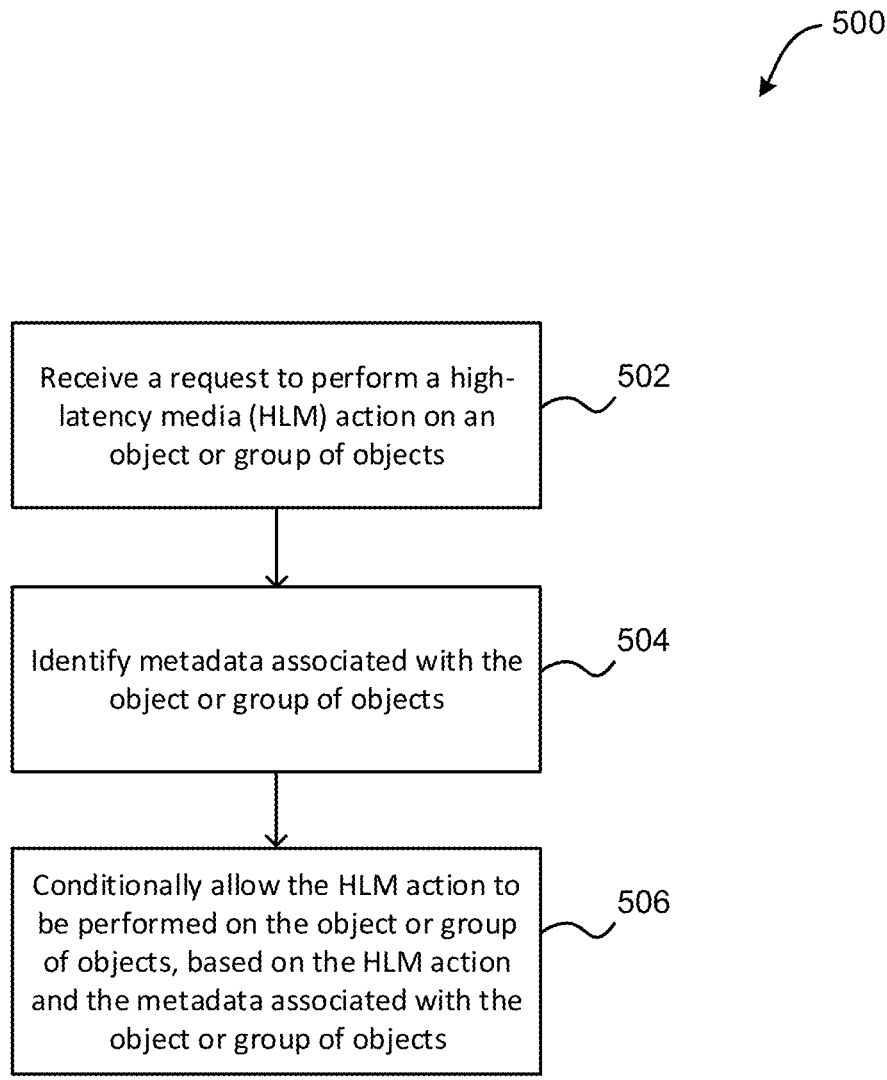
FIG. 5 illustrates a flowchart of a method for controlling HLM actions on objects, in accordance with one embodiment.

Now referring to FIG. 5, a flowchart of a method 500 is shown according to one embodiment. The method 500 may be performed in accordance with the present invention in any of the environments depicted in FIGS. 1-4 and 10, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to perform a high-latency media (HLM) action on an object or group of objects is received. In one embodiment, the object may include an encapsulated representation of data stored within a system. For example, the system may include a compute-storage node. In another example, the object may include data as well as metadata describing the data. In yet another embodiment, the system may be included within a cloud-based computing and/or storage environment.

Additionally, in one embodiment, the HLM action may include a migration action. For example, the migration action may include a movement of the object or group of objects from an object store to the HLM. In another example, the migration action may be performed to offload storage of the object or group of objects to the HLM, in order to free up space within the object store.

Further, in one embodiment, the HLM action may include a recall action. For example, the recall action may include a movement of the object or group of objects from the HLM to an object store. In another example, the recall action may be performed to move the object or group of objects back to the object store so that one or more actions can be performed on it (e.g., so that the object data can be accessed by one or more entities such as a user, an application, etc.). In one embodiment, object data access may be a local read or a remote download.

Further still, in one embodiment, the object store may include a data storage location. In another embodiment, the object store may be hosted by a compute-storage node. For example, the compute-storage node may be included within a compute-storage cluster that contains at least one compute-storage node. In another embodiment, the HLM may include one or more high latency media drives (e.g., tape drives, etc.). For example, the HLM may be used to store data that is not needed for immediate access, but that is not to be deleted (e.g., cold data, etc.).

Also, in one embodiment, the object store and the HLM may be connected utilizing a hierarchical storage management (HSM) system. In another embodiment, the request may be received at the object store. For example, the request may be intercepted by a middleware module located within the object store. In yet another embodiment, the request may be received at the HLM. In still another embodiment, the request may be received using an application programming interface (API) (e.g., a representational state transfer (REST) API, etc.).

In addition, in one embodiment, the request may be received from a user. In another embodiment, the request may be received from an application (e.g., an application that performs scheduled HLM actions, etc.).

Furthermore, method 500 may proceed with operation 504, where metadata associated with the object or group of objects is identified. In one embodiment, the metadata may be stored within the object or group of objects itself. In another embodiment, the metadata may include one or more attributes of the object or group of objects. For example, the metadata may include a lock status indicator (e.g., that indicates whether a lock is currently being held on the associated object or group of objects). In another example, the metadata may include a timestamp (e.g., indicating when the lock was acquired, etc.). In yet another example, the metadata may include an identifier of an entity that acquired the lock. In still another example, the metadata may include a start timestamp indicating a time/date when the lock is to be acquired for the object or group of objects. The metadata may also include a flag indicating that the lock for the object or group of objects needs to be acquired at the next possible non-conflicting time (e.g., waiting in line, etc.).

Further still, in one example, the metadata may include a timespan for which the lock should be acquired. In another example, the metadata may include an end timestamp indicating a time/date when the lock is to be released for the object or group of objects. In yet another example, the metadata may include an indication of one or more actions to be performed on the object or group of objects during the lock (e.g., migration, recall, object data access, etc.). In still another example, the metadata may include an indication of one or more actions to be prevented on the object or group of objects during the lock (e.g., migration, recall, object data access, etc.). In another example, the metadata may include a user-defined comment section.

Also, in one embodiment, the metadata may be retrieved by the entity that receives the request to perform the HLM action on the object or group of objects. For example, the middleware module within the object store may receive the request, and may retrieve the metadata associated with the object or group of objects from within the object store. In another example, the HLM may receive the request, and may retrieve the metadata associated with the object or group of objects by identifying extended attributes of a file representation of the object or group of objects.

Additionally, method 500 may proceed with operation 506, where the HLM action is conditionally allowed to be performed on the object or group of objects, based on the HLM action and the metadata associated with the object or group of objects. In one embodiment, the HLM action may be compared to the metadata in order to determine whether a conflict exists. In another embodiment, the HLM action may include a migration action to be performed either immediately or at a predetermined time and date.

For example, it may be determined that the metadata associated with the object or group of objects indicates that a recall action or an object data access action are to be performed during the predetermined time and date of the requested migration action. In response to such determination, a conflict may be identified and the migration action may be cancelled or postponed. In another example, it may be determined that the metadata associated with the object or group of objects indicates that a lock is currently held on the object or group of objects, such that no migration actions are be performed during the predetermined time and date of the requested migration action. In response to such determination, a conflict may be identified and the migration action may be cancelled or postponed, and an error notification may be sent to the requesting entity. For example, the error notification may include a description of the conflict.

Further, in one example, it may be determined that the metadata associated with the object or group of objects does not indicate any conflicting or prohibited actions during the predetermined time and date of the requested migration action. In response to such determination, no conflict may be identified and the migration action may be allowed.

Further still, in one embodiment, the HLM action may include a recall action to be performed either immediately or at a predetermined time and date. For example, it may be determined that the metadata associated with the object or group of objects indicates that a lock is currently held on the object or group of objects, such that no recall actions are be performed during the predetermined time and date of the requested recall action. In response to such determination, a conflict may be identified and the recall action may be cancelled or postponed, and an error notification may be sent to the requesting entity.

In another example, it may be determined that the metadata associated with the object or group of objects does not indicate any conflicting or prohibited actions during the predetermined time and date of the requested recall action. In response to such determination, no conflict may be identified and the recall action may be allowed.

In this way, an object or group of objects may be pinned or locked in a current state by tagging the object or group of objects with metadata indicating that one or more predetermined HLM actions are to be skipped for that object or group of objects.

Figure 6:
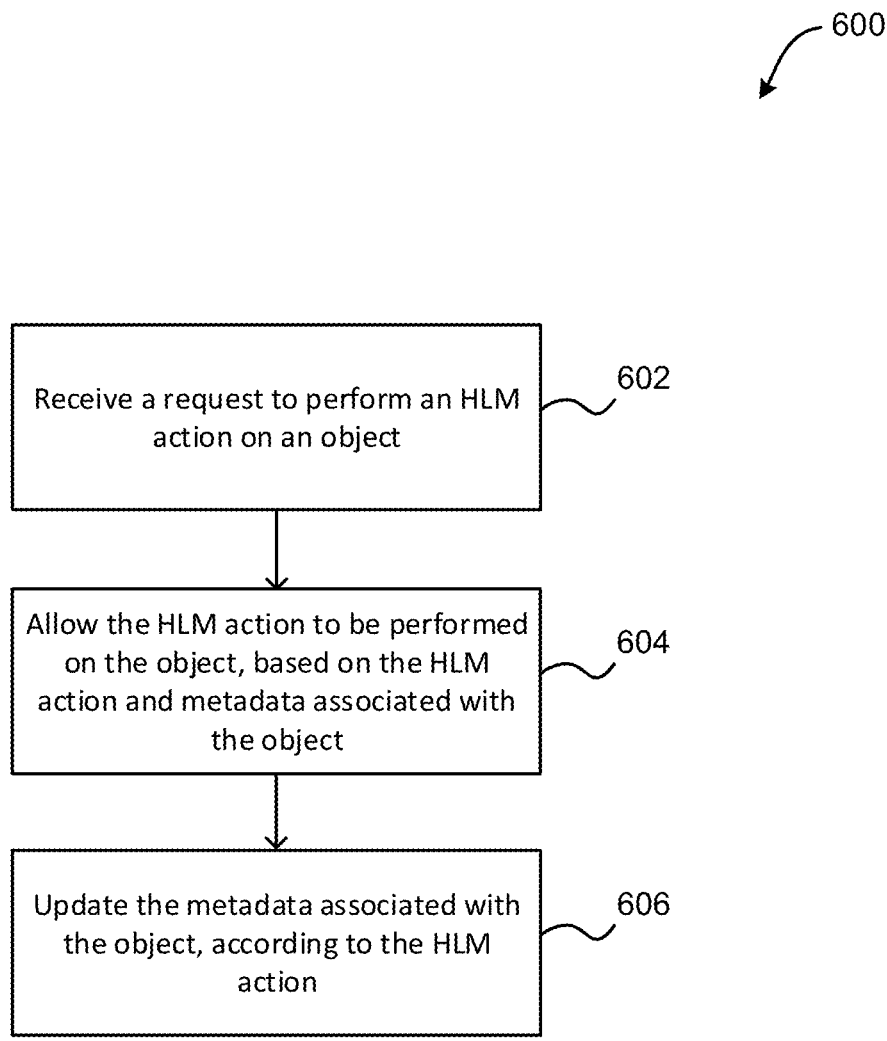
FIG. 6 illustrates a flowchart of a method for updating object lock metadata, in accordance with one embodiment.

Now referring to FIG. 6, a flowchart of a method 600 for updating object lock metadata is shown according to one embodiment. The method 600 may be performed in accordance with the present invention in any of the environments depicted in FIGS. 1-4 and 10, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a request to perform an HLM action on an object is received. In one embodiment, the HLM action may include a migrate or recall action. In another embodiment, the HLM action may include a request to prevent migration or recall on the object. In yet another embodiment, the request may include a request to place a lock on the object. In yet another embodiment, the request may include a predetermined time and/or date (e.g., a time and date that the HLM action is to be performed, a time and data that the lock is desired for the object, etc.). In still another embodiment, the request may include additional lock information to be added to the metadata of the object.

Additionally, method 600 may proceed with operation 604, where the HLM action is allowed to be performed on the object, based on the HLM action and metadata associated with the object. For example, no conflict may be determined when comparing the HLM action to the metadata associated with the object. In another example, no lock may be held on the object during the time and date of the HLM action to be performed on the object.

Further, method 600 may proceed with operation 606, where the metadata associated with the object is updated, according to the HLM action. In one embodiment, the metadata may be updated to include a lock. For example, the lock may include a description of the HLM action, as well as a timestamp indicating a time and date that the HLM action is to be performed on the object. In another example, the lock may include a description of one or more prohibited actions, as well as a time period that those actions are prohibited for the object. In another embodiment, the metadata may be updated within the object store.

Figure 7:
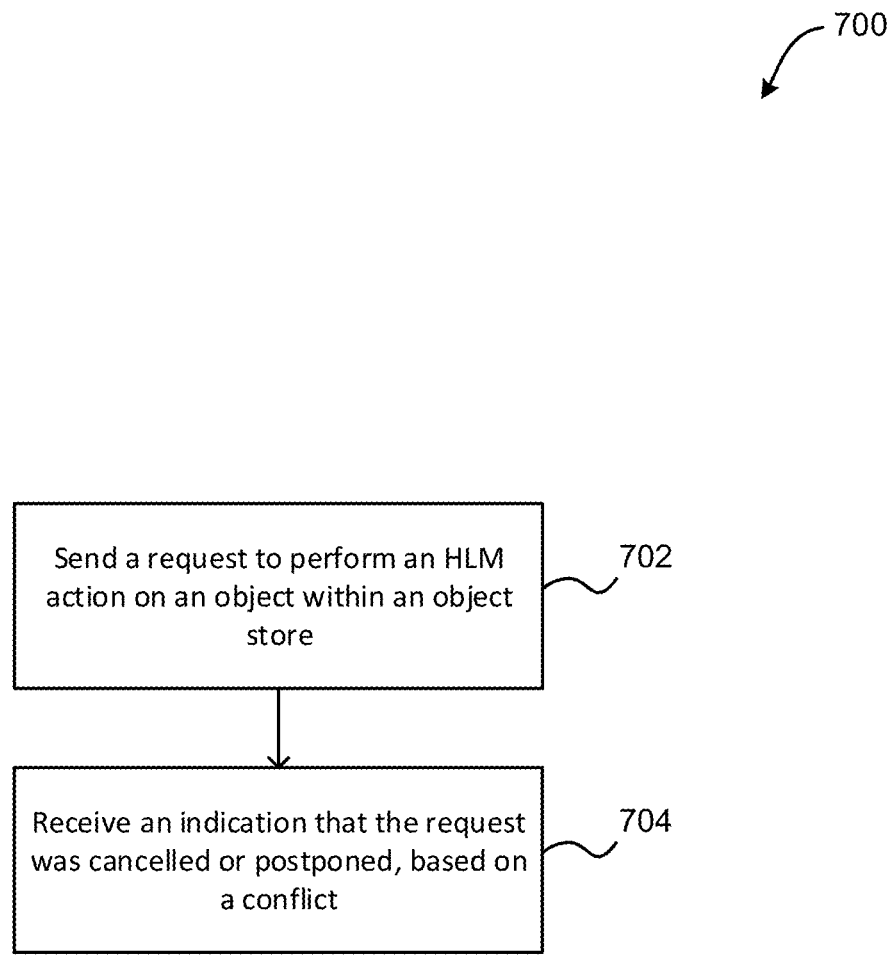
FIG. 7 illustrates a flowchart of a method for interacting with an object store interface, in accordance with one embodiment.

Now referring to FIG. 7, a flowchart of a method 700 for interacting with an object store interface is shown according to one embodiment. The method 700 may be performed in accordance with the present invention in any of the environments depicted in FIGS. 1-4 and 10, among others, in various embodiments. Of course, more or less operations than those specifically described in FIG. 6 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a request to perform an HLM action on an object within an object store is sent. In one embodiment, the request may be sent utilizing an API (e.g., a REST API, etc.). In another embodiment, the request may be sent by a user (e.g., a user of a compute-storage node that stores the object, etc.). In yet another embodiment, the request may be sent by an application (e.g., an automated application within the compute-storage node or the compute-storage cluster, etc.).

Additionally, method 700 may proceed with operation 704, where an indication is received that the request was cancelled or postponed, based on a conflict. In one embodiment, the indication may include details regarding the conflict that prevented the request from being implemented. In another embodiment, the indication may include a description of a lock on the object. In yet another embodiment, the indication may include a description of one or more prohibited actions to be performed on the object. In still another embodiment, the indication may include a time period associated with the lock and/or the prohibited actions.

Figure 8:
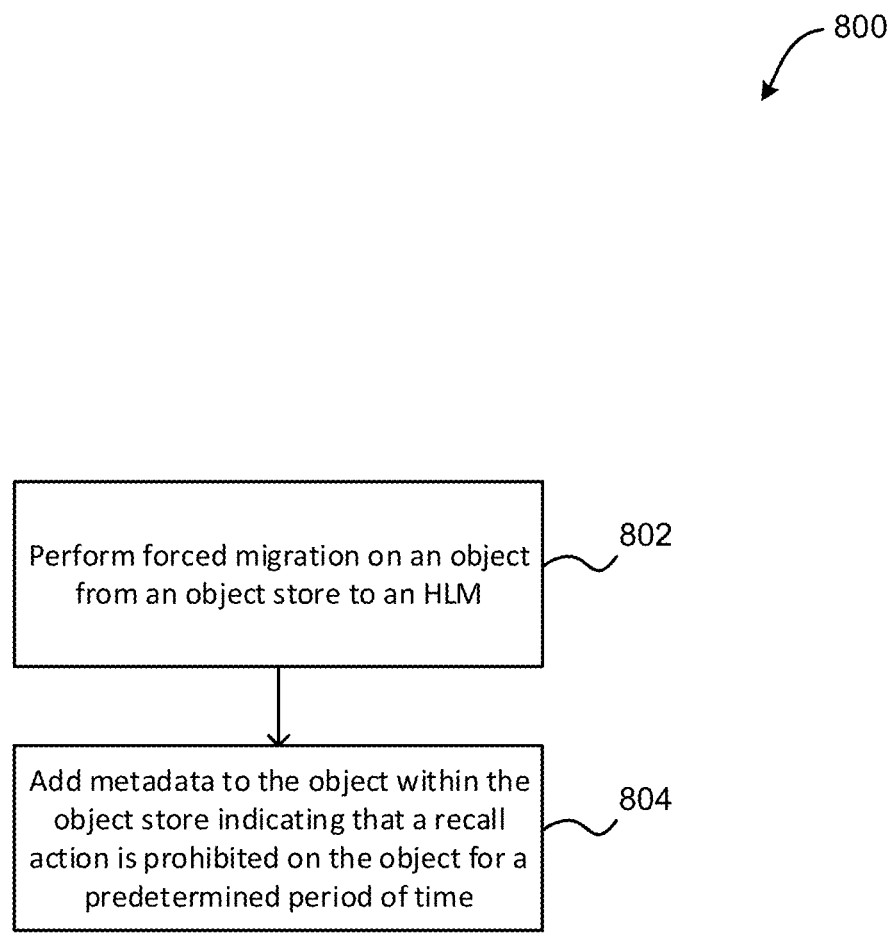
FIG. 8 illustrates a flowchart of a method for enforcing forced migration, in accordance with one embodiment.

Now referring to FIG. 8, a flowchart of a method 800 for enforcing forced migration is shown according to one embodiment. The method 800 may be performed in accordance with the present invention in any of the environments depicted in FIGS. 1-4 and 10, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where forced migration is performed on an object from an object store to high latency media (HLM). In one embodiment, the forced migration may be performed automatically according to a predetermined policy. In another embodiment, the forced migration may be performed manually by an administrator of the object store. In yet another embodiment, the forced migration may be performed in response to determining that a storage quota has been exceeded within the object store (e.g., a user has stored an amount of data within the object store that exceeds a predetermined threshold). In still another embodiment, the forced migration may include migrating the object from the object store to the HLM.

Additionally, method 800 may proceed with operation 804, where metadata is added to the object within the object store indicating that a recall action is prohibited on the object for a predetermined period of time. In one embodiment, the metadata may be added automatically according to a predetermined policy. In another embodiment, the metadata may be added manually by an administrator of the object store. In yet another embodiment, the metadata may indicate that a lock is on the object for the predetermined period of time. In still another embodiment, the metadata may indicate a duration or a start and end time and date during which the recall action is prohibited.

Further, in one embodiment, a user wishing to perform a recall action on the data may request removal of the lock. For example, the user may add a comment requesting removal of the lock to metadata of the object. In another example, the user may contact an administrator of the object store to request lock removal. In this way, arbitrary user-initiated recall actions on data subject to forced migration may be prevented.

Figure 9:
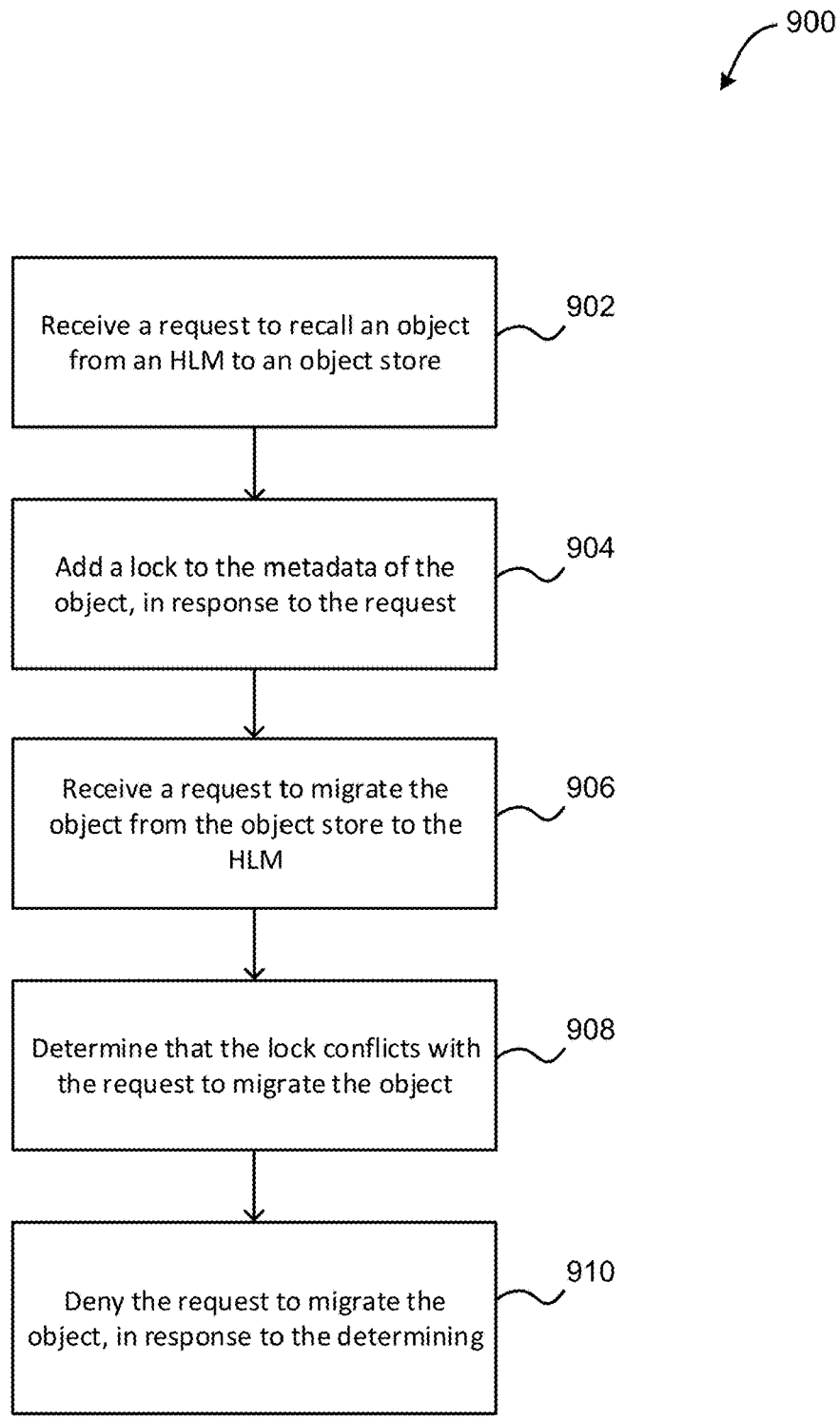
FIG. 9 illustrates a flowchart of a method for denying HLM requests that conflict with object lock metadata, in accordance with one embodiment.

Now referring to FIG. 9, a flowchart of a method 900 for denying HLM requests that conflict with object lock metadata is shown according to one embodiment. The method 900 may be performed in accordance with the present invention in any of the environments depicted in FIGS. 1-4 and 10, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a request to recall an object from high latency media (HLM) to an object store is received. In one embodiment, the request may be received by a user, by an application, etc. In another embodiment, the request may include an immediate request or a request to perform recall of the object at a future date and time.

Additionally, method 900 may proceed with operation 904, where a lock is added to the metadata of the object, in response to the request. In one embodiment, the lock may prevent a migration action from being performed on the object until after the recall has been performed, until after access of the recalled data has been performed, etc. In another embodiment, the lock may prevent a migration action from being performed on the object for a predetermined time after the recall has been being performed. In yet another embodiment, the predetermined time may be indicated by one or more timestamps within the metadata.

Further, method 900 may proceed with operation 906, where a request is received to migrate the object from the object store to the HLM. In one embodiment, the request may be received by a user, by an application (e.g., as part of a data maintenance operation), etc. In another embodiment, the request may include an immediate request or a request to perform migration of the object at a future date and time.

Further still, method 900 may proceed with operation 908, where it is determined that the lock conflicts with the request to migrate the object. In one embodiment, the determining may include analyzing details of the lock within the metadata of the object. In another embodiment, the determining may include determining that the lock prevents migration of the object during the requested date and time and date of migration.

Also, method 900 may proceed with operation 910, where the request to migrate the object is denied, in response to the determining. In one embodiment, the denying may include returning a notification to the requesting entity indicating that a lock is held on the object that prevents migration during the requested time and date. In this way, object migration may be prevented during recall of the object.

Figure 10:
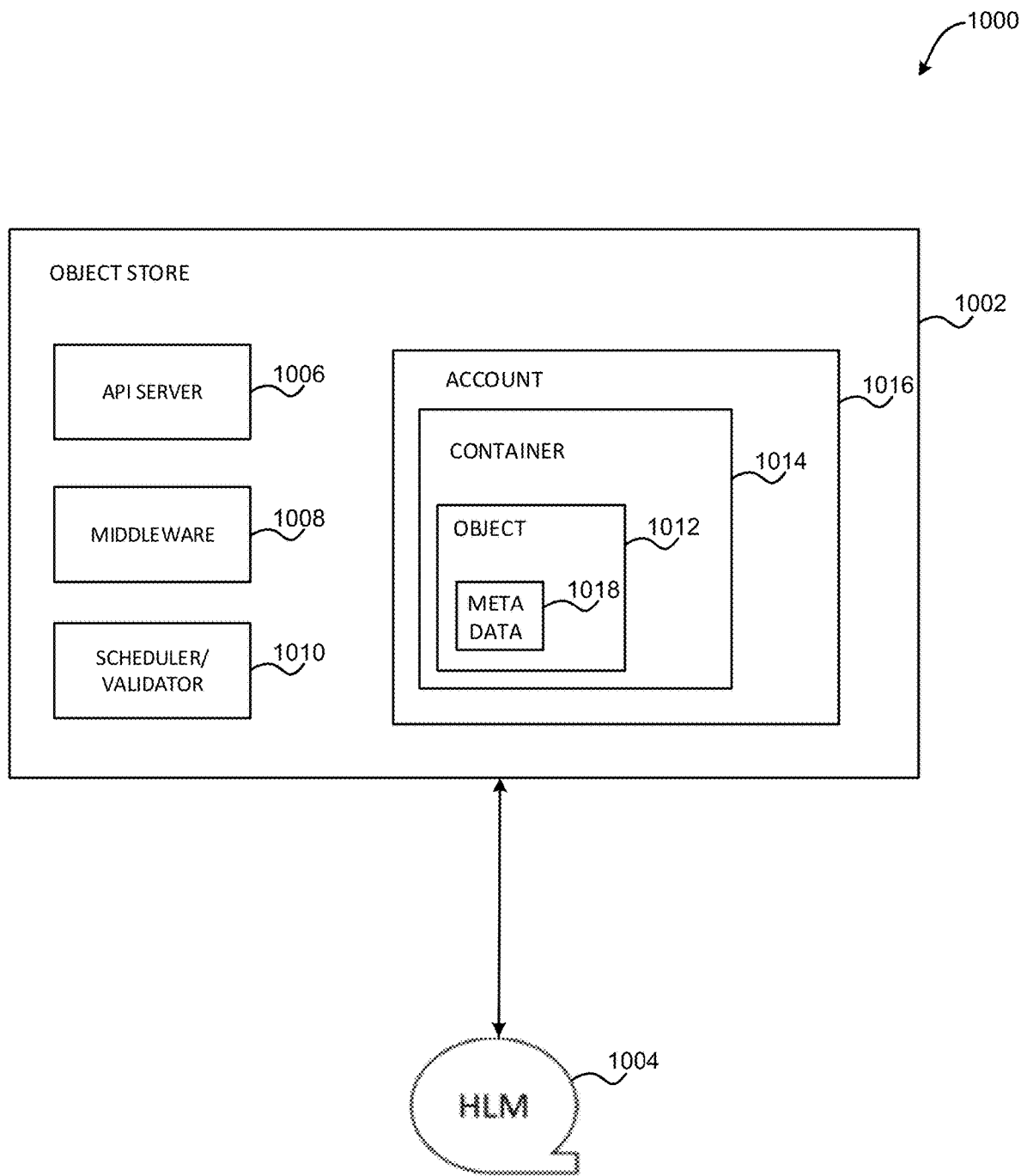
FIG. 10 illustrates an exemplary object storage system, in accordance with one embodiment.

FIG. 10 illustrates an exemplary object storage system 1000, according to one embodiment. As shown in FIG. 10, the system 1000 includes an object store 1002 in communication with high latency media (HLM) 1004. In one embodiment, the object store 1002 may be hosted by a compute-storage node. For example, a compute-storage cluster may include at least one compute-storage node, where the compute-storage node hosts the object store 1002 and exports access to the object store via an API server 1006 (e.g. using commands such as REST API: GET, PUT, DELETE, etc). For example, the API server 1006 may an API used to get, put, and delete data within the object store 1002.

Additionally, in one embodiment, applications may use the API server 1006 to create, read, write and delete data to the object store 1002. In another embodiment, the object store 1002 may be connected to the HLM 1004 to tier data that is not needed in the object store 1002 for immediate access, but may not be deleted (e.g. cold data, etc.). In yet another embodiment, the connection between the object store 1002 and the HLM 1004 may be implemented utilizing a hierarchical storage management (HSM) system. In still another embodiment, the data movement from the object store 1002 to the HLM 1004 may be called migration, and the data movement from the HLM 1004 to the object store 1002 may be called recall.

Further, the object store 1002 includes middleware 1008, as well as a scheduler/validator 1010. In one embodiment, the middleware 1008 may receive and implement lock requests. In another embodiment, the scheduler/validator 1010 may check metadata for scheduled actions and may update a lock status, based on the scheduled actions.

For example, a user may upload an object 1012 via a REST PUT request. The object 1012 may be stored in a container 1014 within an account 1016 in the object store 1002. In one embodiment, this object 1012 may be stored on a hard disk drive (HDD) when it is located within the object store 1002. Metadata 1018 is also stored for the object 1012 (e.g., as extended attributes (xattr), etc.).

Additionally, a user may send an object HLM (allowed) action request that indicates that the object 1012 is not to be migrated until a predetermined date and time. This action request may be received by the middleware 1008 and may be validated by the scheduler/validator 1010. In response to the validation, the HLM action may be stored by the middleware 1008 in the metadata 1018 of the object 1012.

Further, a user may subsequently send a migration request for the object 1012. This migration request may be received by the middleware 1008, and may be checked against allowed HLM actions by looking at the metadata 1018 of the object 1012. In response to determining that the metadata 1018 indicates that the migration is prevented during the requested time and date, the migration request for the object 1012 may be cancelled. In response to determining that the metadata 1018 indicates that the migration is not prevented during the requested time and date, the migration request for the object 1012 may be forwarded to the HLM 1004.

Further still, in another example, a user may send a migration request for the object 1012 directly to the HLM 1004. The HLM 1004 may receive the request and may check for allowed HLM actions by looking at the metadata 1018 for the object 1012. For instance, the HLM 1004 may look at the xattrs of a file representation of the object 1012. In response to determining that the metadata 1018 indicates that the migration is prevented during the requested time and date, the migration request for the object 1012 may be cancelled. In response to determining that the metadata 1018 indicates that the migration is not prevented during the requested time and date, the migration request for the object 1012 may be executed by the HLM 1004.

Signaling and Maintaining Allowed High-Latency Media Actions on Objects

In one embodiment, an object may be tagged with a lock, which may allow users or applications to fence HLM operations based on an object pin/lock status. Additionally, this may provide users or applications with the possibility to block HLM operations on certain containers or objects once the user or the application is aware of the future access.

This may also enable users or applications to attach allowed or fenced HLM actions (e.g., migrate, recall, schedule, etc.) directly with the object as metadata. This functionality may also be used to prevent the problem of too many recalls (e.g., "recall storms," etc.) triggered by users or applications that are not aware of the impact of recalls on the utilization of shared tape drives.

Object Storage

Object storage (also known as object-based storage) may include a computer data storage architecture that manages data as objects, as opposed to other storage architectures like file systems which manage data as a file hierarchy and block storage which manages data as blocks within sectors and tracks. Each object may include the data itself, a variable amount of metadata, and a globally unique identifier. Object storage may be implemented at multiple levels, including the device level (object storage device), the system level, and the interface level. In each case, object storage may seek to enable capabilities not addressed by other storage architectures, like interfaces that can be directly programmable by the application, a namespace that can span multiple instances of physical hardware, and data management functions like data replication and data distribution at object-level granularity. Object storage systems may allow retention of massive amounts of unstructured data.

Hierarchical Storage Management (HSM)

Hierarchical storage management (HSM) may include a data storage technique, which may automatically move data between high-cost and low-cost storage media. HSM systems may be implemented because high-speed storage devices, such as solid-state drive arrays, are more expensive (per byte stored) than slower devices, such as hard disk drives, optical discs and magnetic tape drives. Storing all data on high-speed devices all the time may be prohibitively expensive. Instead, HSM systems may store the bulk of an entity's data on slower devices, and may then copy data to faster disk drives when needed. In effect, HSM may turn the fast disk drives into caches for the slower mass storage devices. The HSM system may monitor the way data is used and may make estimations as to which data can safely be moved to slower devices and which data should stay on the fast devices.

HSM may also be used where more robust storage is available for long-term archiving, but is slow to access. This may be as simple as implementing an off-site backup for protection against a physical damage to a building.

Redundant Storage Systems

Scalable redundant storage systems may be used to write objects and files to multiple disk drives spread throughout servers in a data center, with storage software responsible for ensuring data replication and integrity across the cluster. Storage clusters may scale horizontally by adding new servers. Should a server or hard drive fail, the system may replicate its content from other active nodes to new locations in the cluster. The system may use software logic to ensure data replication and distribution across different devices, which may enable the use of inexpensive commodity hard drives and servers.

Implementation

In one embodiment, access rights may be lifted to a higher more logical level. In another embodiment, the current implementation may allow this signaling of HLM access to objects for third-party application business logic reasons. This information may be gathered in high-level applications as well to determine if someone/something has an object pinned/locked down. The current implementation may provide the possibility to signal allowed HLM actions on objects, and may provide administration and maintenance to given allowed HLM actions on objects.

Components

In one embodiment, the system may include the following components:
- Object metadata which may be readable and writeable by a file-based system
- Middleware that may receive REST requests and may translate those to metadata tags after validating the request
- a service that may ensure attached schedules are recognized and executed
- a service that may validate if given allowed HLM actions are still valid Additionally, in one embodiment, an application may call a REST request for a certain object or container located in the object store to tell if a HLM action should be prevented. The application may also request by schedule to migrate or recall an object. The application may attach a "delete [action entry] at [timestamp]". Also, multiples of these rules may be attached to the object. In another embodiment, the new function may be part of a new proprietary middleware that exists on top of redundant storage system middleware.

Object Metadata

To allow pinning/locking actions on an object, object metadata may be enhanced by the following attributes:
- Lock status
- timestamp of when lock acquired (date and time, HLM action type)
- acquired by who (maybe called user/owner/creator)
- acquired by host or region
- timestamp of when last object was accessed (GET)
- times the object was accessed (GET)

timestamp of last HLM MIGRATE command
timestamp of last HLM RECALL command
user-defined comment section (in case user wants to pass along information via text, etc.)
start timestamp of when lock should be acquired (date and time, HLM action type)
timespan for which the lock should be acquired (timespan based on former given start timestamp, HLM action type)
end timestamp at which the lock needs to be released (date and time, HLM action type)

In one embodiment, all of the above attributes may not need to be present, and may exist in multiple combinations as sets. For example, a first set may lock migration for a first predetermined time period, a second set may lock recall for a second predetermined time period, a third set may lock migration for a third predetermined time period different from the first and second time periods, etc.

Middleware

In one embodiment, the middleware may control the object/container status/access. For example, the middleware may receive REST requests which request pinning/locking actions for one or more objects or containers. The request may contain user information that can be used for the tagging. The middleware may validate the request on format and against existing requests for the given object(s) and/or container(s). The middleware may be able to consider the container object hierarchy, which may be needed to provide hierarchical pinning/locking.

If the request is confirmed to be valid, the middleware may apply the given request to the object(s), container(s). If the request is determined to be invalid, the middleware may reply to the caller with an error stating why the request could not be applied. The request may also be part of an HLM action. If the request is valid, the request may be forwarded to the HLM system. As the object is also present as a file and the file metadata may be read by a user or application that is able to access the filesystem, the HLM system may be able to also access the pinning/locking details directly from the file side.

In another embodiment, the middleware may provide an object/container pinning/locking status. For example, the middleware may handle HLM object status requests. The middleware may determine whether a certain HLM operation can be executed on a given object(s) and/or container(s) and may return the result to an entity. The request may hold a certain timestamp or timespan at which a HLM action is planned to be executed, and the middleware may reply if it is valid, if a certain other time/timespan would fit, or which object(s), including the details (see object metadata) prevent the execution of the action.

To allow for further HLM business logic, the middleware may keep track of the last time object data was accessed (GET) and how often it was accessed. If a request is received, HLM relevant object metadata may be validated for consistency and lock status and may be corrected if required (i.e. for rules that are in the past, etc.).

Scheduler and Validator

In one embodiment, a scheduler/validator may periodically check the HLM relevant object metadata for scheduled HLM actions. If the scheduler finds such a request, it may update the lock status accordingly (e.g., by locking/unlocking for a given HLM action). Updating the status by a separate service may also help to easily request the lock status from the file side.

Additionally, the scheduler/validator may also validate a given pinning/locking rule as still valid and remove the rule if it is not valid. This may reduce the amount of metadata that is used for an object or container.

In one example, a storage system administrator may be able to allow users to recall a small number of objects (a limit may be set as to how many such requests may be submitted at a time), but recalling the entire container (that would heavily use resources such as scarce tape drives) may be set by administrator to be rejected and to trigger an error message requesting the user to contact the administrator for approval, in which case the administrator may decide to unset the attribute that allows accessing objects data of the entire container.

In another example, for the automation of a process, an administrator action may be combined or replaced with quota mechanisms, so the user may get informed of his quota and may confirms the "resource intensive" recall request. In yet another example, for certain accounts and/or containers, the administrator may allow the submission of one container recall per user at a time, and the submission of the next recall only once the first recall is completed, which may allow other users' recalls to be performed in the meantime.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
in response to receiving a request from a user to migrate an object or group of objects from an object store to high-latency media (HLM):
identifying metadata stored within the object or group of objects, the metadata including a status of a lock associated with the object or group of objects; and
conditionally migrating the object or group of objects, based on the metadata stored within the object or group of objects.
2. The computer-implemented method of claim 1, wherein:
the metadata includes:
an identifier of an entity that acquired the lock, a start timestamp indicating a time and date when the lock is to be acquired for the object or group of objects, a timespan for which the lock is acquired, an end timestamp indicating a time and date when the lock is to be released for the object or group of objects, an indication of one or more actions to be performed on the object or group of objects during the lock, an indication of one or more actions to be prevented on the object or group of objects during the lock, and a user-defined comment section; and conditionally migrating the object or group of objects, based on the metadata associated with the object, includes:

determining a predetermined time and date of the requested migration, postponing the requested migration in response to determining that the metadata associated with the object or group of objects indicates that the lock is currently held on the object or group of objects, and allowing the requested migration in response to determining that the metadata associated with the object or group of objects does not indicate any conflicting or prohibited actions during the predetermined time and date of the requested migration.

3. The computer-implemented method of claim 1, wherein the request is received using an application programming interface (API).

4. The computer-implemented method of claim 1, wherein the metadata includes an indication as to whether the lock is currently being held on the object or group of objects for one or multiple HLM operations.

5. The computer-implemented method of claim 1, wherein the metadata includes:

an identifier of an entity that acquired the lock;

a start timestamp indicating a time and date when the lock is to be acquired for the object or group of objects;

a timespan for which the lock is acquired;

an end timestamp indicating a time and date when the lock is to be released for the object or group of objects;

an indication of one or more actions to be performed on the object or group of objects during the lock;

an indication of one or more actions to be prevented on the object or group of objects during the lock; and a user-defined comment section.

6. The computer-implemented method of claim 1, wherein the metadata associated with the object or group of objects is identified from extended attributes of a file representation of the object or group of objects.

7. The computer-implemented method of claim 1, further comprising comparing the request to migrate the object or group of objects to the metadata in order to determine whether the lock prevents accepting or currently executing the request.

8. The computer-implemented method of claim 1, further comprising cancelling or postponing the requested migration, in response to determining that:

the requested migration is to be performed at a predetermined time and date, and the metadata associated with the object or group of objects indicates that the lock is currently held on the object or group of objects, such that no migration actions are be performed during the predetermined time and date of the requested migration.

9. The computer-implemented method of claim 1, further comprising identifying a conflict, and cancelling or postponing the requested migration, in response to determining that:

the requested migration is to be performed at a predetermined time and date, and the metadata associated with the object or group of objects indicates that an object data access action are to be performed during the predetermined time and date of the requested migration.

10. The computer-implemented method of claim 1, further comprising allowing the requested migration, in response to determining that:

the requested migration is to be performed at a predetermined time and date, and the metadata associated with the object or group of objects does not indicate any conflicting or prohibited actions during the predetermined time and date of the requested migration.

11. The computer-implemented method of claim 1, wherein:

the lock prevents a migration action from being performed on the object or group of objects until after a recall action has been performed, and conditionally migrating the object or group of objects, based on the metadata associated with the object, includes determining a predetermined time and date of the requested migration, and postponing the requested migration in response to determining that the recall action is to be performed during the predetermined time and date of the requested migration.

12. A computer program product for controlling a high-latency media (HLM) action on an object or group of objects, the computer program product comprising a computer readable storage medium having program instructions embodied therewith, wherein the computer readable storage medium is not a transitory signal per se, the program instructions executable by a processor to cause the processor to perform a method comprising:

in response to receiving, by the processor, a request from a user to migrate an object or group of objects from an object store to high-latency media (HLM):

identifying metadata stored within the object or group of objects, utilizing the processor, the metadata including a status of a lock associated with the object or group of objects; and conditionally migrating the object or group of objects, based on the metadata stored within the object or group of objects, utilizing the processor.

13. The computer program product of claim 12, wherein conditionally migrating the object or group of objects, based on the metadata associated with the object, includes:

determining, utilizing the processor, a predetermined time and date of the requested migration;

postponing, utilizing the processor, the requested migration in response to determining that that the metadata associated with the object or group of objects indicates that a recall action is to be performed during the predetermined time and date of the requested migration;

postponing, utilizing the processor, the requested migration in response to determining that the metadata associated with the object or group of objects indicates that the lock is currently held on the object or group of objects; and allowing, utilizing the processor, the requested migration in response to determining that the metadata associated with the object or group of objects does not indicate any conflicting or prohibited actions during the predetermined time and date of the requested migration.

14. The computer program product of claim 12, wherein the request is received using an application programming interface (API).

15. The computer program product of claim 12, wherein the metadata includes an indication as to whether the lock is currently being held on the object or group of objects.

16. The computer program product of claim 12, wherein the metadata includes:
    an identifier of an entity that acquired the lock;
    a start timestamp indicating a time and date when the lock is to be acquired for the object or group of objects;
    a timespan for which the lock should be acquired;
    an end timestamp indicating a time and date when the lock is to be released for the object or group of objects;
    an indication of one or more actions to be performed on the object or group of objects during the lock;
    an indication of one or more actions to be prevented on the object or group of objects during the lock; and
    a user-defined comment section.

17. The computer program product of claim 12, wherein the metadata associated with the object or group of objects is identified from extended attributes of a file representation of the object or group of objects.

18. A computer-implemented method, comprising:
    in response to receiving a request from a user to migrate an object or group of objects from an object store to high-latency media (HLM):
        identifying metadata stored within the object or group of objects, the metadata including:
            a status of a lock associated with the object or group of objects,
            an identifier of an entity that acquired the lock,
            a start timestamp indicating a time and date when the lock is to be acquired for the object or group of objects,
            a timespan for which the lock is acquired,
            an end timestamp indicating a time and date when the lock is to be released for the object or group of objects,
            an indication of one or more actions to be performed on the object or group of objects during the lock, and
            an indication of one or more actions to be prevented on the object or group of objects during the lock; and
        conditionally migrating the object or group of objects, based on the metadata stored within the object or group of objects, including:
            determining a predetermined time and date of the requested migration,
            postponing the requested migration in response to determining that the metadata associated with the object or group of objects indicates that the lock is currently held on the object or group of objects, and
            allowing the requested migration in response to determining that the metadata associated with the object or group of objects does not indicate any conflicting or prohibited actions during the predetermined time and date of the requested migration.

* * * * *